(12) United States Patent
Kim

(10) Patent No.: US 12,548,763 B2
(45) Date of Patent: Feb. 10, 2026

(54) LITHIUM-SULFUR SECONDARY BATTERY

(71) Applicant: LG ENERGY SOLUTION, LTD., Seoul (KR)

(72) Inventor: Minsu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 788 days.

(21) Appl. No.: 17/601,119

(22) PCT Filed: Jul. 2, 2020

(86) PCT No.: PCT/KR2020/008651
§ 371 (c)(1),
(2) Date: Oct. 4, 2021

(87) PCT Pub. No.: WO2021/010626
PCT Pub. Date: Jan. 21, 2021

(65) Prior Publication Data
US 2022/0173383 A1    Jun. 2, 2022

(30) Foreign Application Priority Data

Jul. 18, 2019 (KR) .......... 10-2019-0086694
Jun. 30, 2020 (KR) .......... 10-2020-0080086

(51) Int. Cl.
*H01M 10/00* (2006.01)
*H01M 4/36* (2006.01)
(Continued)

(52) U.S. Cl.
CPC ............ *H01M 4/364* (2013.01); *H01M 4/58* (2013.01); *H01M 4/60* (2013.01); *H01M 10/052* (2013.01);
(Continued)

(58) Field of Classification Search
CPC ........ H01M 4/38; H01M 4/362; H01M 4/625; H01M 10/0525; H01M 2004/021;
(Continued)

(56) References Cited

U.S. PATENT DOCUMENTS 6,194,099 B1 *   2/2001  Gernov ................. H01M 4/625
                                                       29/623.5
12,021,224 B2 *  6/2024  Lee .................... H01M 10/0569
(Continued)

FOREIGN PATENT DOCUMENTS

CN    1487620 A    4/2004
CN   105742659 A    7/2016
(Continued)

OTHER PUBLICATIONS

Machine translation of CN 110010857, obtained Apr. 2024 (Year: 2019).*

(Continued)

*Primary Examiner* — Nicholas P D'Aniello
(74) *Attorney, Agent, or Firm* — Birch, Stewart, Kolasch & Birch, LLP

(57) ABSTRACT

Disclosed is a lithium-sulfur secondary battery, and in particular, a lithium-sulfur secondary battery capable of obtaining high energy density compared to conventional lithium-sulfur batteries by a positive electrode including catalytic site-introduced sulfur, and specifying conditions of the positive electrode and an electrolyte liquid.

17 Claims, 1 Drawing Sheet

(51) Int. Cl.
| | |
|---|---|
| *H01M 4/58* | (2010.01) |
| *H01M 4/60* | (2006.01) |
| *H01M 10/052* | (2010.01) |
| *H01M 10/0569* | (2010.01) |
| *H01M 4/02* | (2006.01) |

(52) U.S. Cl.
CPC .. *H01M 10/0569* (2013.01); *H01M 2004/021* (2013.01); *H01M 2004/028* (2013.01); *H01M 2220/20* (2013.01); *H01M 2300/0034* (2013.01); *H01M 2300/0037* (2013.01)

(58) Field of Classification Search
CPC ....... H01M 2004/028; H01M 2220/20; H01M 2300/0037; H01M 2300/0034; H01M 4/13; H01M 4/139; H01M 4/382; H01M 10/0569; H01M 10/052; Y02E 60/10
See application file for complete search history.

(56) References Cited

U.S. PATENT DOCUMENTS

| | | | |
|---|---|---|---|
| 12,155,063 B2* | 11/2024 | Kim | H01M 4/62 |
| 2002/0009639 A1 | 1/2002 | Miyake et al. | |
| 2004/0009393 A1 | 1/2004 | Kim et al. | |
| 2010/0183950 A1 | 7/2010 | Dai | |
| 2011/0008531 A1 | 1/2011 | Mikhaylik et al. | |
| 2011/0070494 A1 | 3/2011 | Campbell et al. | |
| 2013/0029234 A1 | 1/2013 | Roev et al. | |
| 2013/0040185 A1 | 2/2013 | Takase | |
| 2013/0280600 A1 | 10/2013 | Uehara et al. | |
| 2013/0337347 A1* | 12/2013 | Pol | H01M 4/583 568/18 |
| 2014/0255796 A1 | 9/2014 | Matsuoka et al. | |
| 2014/0322618 A1 | 10/2014 | Braun | |
| 2014/0356736 A1 | 12/2014 | Choi et al. | |
| 2016/0056452 A1 | 2/2016 | Tamura et al. | |
| 2016/0181600 A1* | 6/2016 | Omoda | H01M 4/625 429/212 |
| 2016/0190646 A1 | 6/2016 | Kim et al. | |
| 2018/0062206 A1 | 3/2018 | Yang et al. | |
| 2018/0175395 A1 | 6/2018 | Lee et al. | |
| 2018/0248227 A1 | 8/2018 | Park et al. | |
| 2018/0277913 A1 | 9/2018 | Pan et al. | |
| 2018/0301739 A1 | 10/2018 | Park et al. | |
| 2019/0123377 A1 | 4/2019 | Yang et al. | |
| 2019/0267625 A1 | 8/2019 | Lee et al. | |
| 2020/0136127 A1 | 4/2020 | Cho et al. | |
| 2022/0173382 A1 | 6/2022 | Kim | |

FOREIGN PATENT DOCUMENTS

| | | |
|---|---|---|
| CN | 108232162 A | 6/2018 |
| CN | 108630947 A | 10/2018 |
| CN | 106957055 B | 1/2019 |
| CN | 109449439 A | 3/2019 |
| CN | 109728297 A | 5/2019 |
| CN | 110010857 A | 7/2019 |
| DE | 10 2015 225 286 A1 | 6/2017 |
| EP | 3 480 881 A1 | 5/2019 |
| JP | 2001-307727 A | 11/2001 |
| JP | 2004-342337 A | 12/2004 |
| JP | 2013-503439 A | 1/2013 |
| JP | 2015-505825 A | 2/2015 |
| JP | 2016-190233 A | 11/2016 |
| JP | WO2014/157630 A1 | 2/2017 |
| JP | 2017-178859 A | 10/2017 |
| JP | 2022-528136 A | 6/2022 |
| KR | 10-0363277 B1 | 11/2002 |
| KR | 10-2010-0113553 A | 10/2010 |
| KR | 10-2013-0014650 A | 2/2013 |
| KR | 10-2013-0018511 A | 2/2013 |
| KR | 10-1379716 B1 | 3/2014 |
| KR | 10-2014-0140686 A | 12/2014 |
| KR | 10-2015-0088913 A | 8/2015 |
| KR | 10-2016-0002253 A | 1/2016 |
| KR | 10-2016-0037084 A | 4/2016 |
| KR | 10-1622093 B1 | 5/2016 |
| KR | 10-2016-0080995 A | 7/2016 |
| KR | 10-1654136 B1 | 9/2016 |
| KR | 10-2017-0023304 A | 3/2017 |
| KR | 10-2017-0023305 A | 3/2017 |
| KR | 10-2017-0092455 A | 8/2017 |
| KR | 10-2017-0121047 A | 11/2017 |
| KR | 10-2018-0013499 A | 2/2018 |
| KR | 10-2018-0061034 A | 6/2018 |
| KR | 10-2018-0066615 A | 6/2018 |
| KR | 10-2018-0072122 A | 6/2018 |
| KR | 10-2018-0102406 A | 9/2018 |
| KR | 10-2018-0103275 A | 9/2018 |
| KR | 10-2018-0133063 A | 12/2018 |
| KR | 10-2019-0004651 A | 1/2019 |
| WO | WO 2013/062056 A1 | 5/2013 |
| WO | WO 2018/007665 A1 | 1/2018 |
| WO | WO 2018/132937 A1 | 7/2018 |
| WO | WO 2019/009560 A1 | 1/2019 |

OTHER PUBLICATIONS

Fotouhi et al., "Lithium-Sulfur Battery Technology Readiness and Applications—A Review", Energies, 2017, vol. 10, No. 12, 1937, total 15 pages.
Han et al., "Scalable Holey Graphene Synthesis and Dense Electrode Fabrication toward High-Performance Ultracapacitors", ACS Nano, 2014, vol. 8, No. 8, pp. 8255-8265, total 11 pages.
International Search Report for PCT/KR2020/008651 mailed on Oct. 8, 2020.
Lim et al., "Synergistic Effect of Molecular-Type Electrocatalysts with Ultrahigh Pore Volume Carbon Microspheres for Lithium-Sulfur Batteries", ACS Nano, 2018, vol. 12, No. 6, pp. 6013-6022, total 36 pages.
Salem et al., "Electrocatalytic polysulfide-traps for controlling redox shuttle process of Li—S battery", Journal of the American Chemical Society, 2015, vol. 137, No. 36, pp. 11542-11545, total 6 pages.
Yang et al., "Structural Design of Lithium-Sulfur Batteries: From Fundamental Research to Practical Application", Electrochemical Energy Reviews, 2018, vol. 1, pp. 239-293.
Cuisinier et al. "Unique behaviour of nonsolvents for polysulphides in lithium-sulphur batteries" Energy Environ. Sci, 2014, 7, pp. 2697-2705.
Extended European Search Report for European Application No. 20841043.1, dated Aug. 19, 2022.
Partial Supplementary European Search Report for European Application No. 20841043.1, dated May 18, 2022.

* cited by examiner

LITHIUM-SULFUR SECONDARY BATTERY

TECHNICAL FIELD

This application claims the benefit of Korean Patent Application No. 10-2019-0086694 on Jul. 18, 2019 with the Korean Intellectual Property Office, and Korean Patent Application No. 10-2020-0080086 on Jun. 30, 2020 with the Korean Intellectual Property Office, the disclosure of which are herein incorporated by reference in their entirety.

The present invention relates to a lithium-sulfur secondary battery.

BACKGROUND ART

As application areas of secondary batteries expand to electric vehicles (EV), energy storage systems (ESS) or the like, lithium-ion secondary batteries having relatively low weight to energy storage density (~250 Wh/kg) have limits in applications for such products. On the other hand, a lithium-sulfur secondary battery has high theoretical energy density (~2,600 Wh/kg), and thereby has received attention as a next generation secondary battery technology.

A lithium-sulfur secondary battery is a battery system using a sulfur-based material having a sulfur-sulfur bond as a positive electrode active material, and lithium metal as a negative electrode active material. Such a lithium-sulfur secondary battery has advantages in that sulfur, a main material of the positive electrode active material, is very abundant in resources globally, has no toxicity and has a low atomic weight.

During discharge of a lithium-sulfur secondary battery, lithium, a negative electrode active material, is oxidized while releasing electrons and being ionized, and a sulfur-based material, a positive electrode active material, is reduced by receiving the electrons. At this time, the oxidation reaction of lithium is a process in which lithium metal releases electrons and changes into a lithium cation form. In addition, the reduction reaction of sulfur is a process in which a sulfur-sulfur bond receives two electrons and changes into a sulfur anion form. The lithium cation produced through the oxidation reaction of lithium is transferred to a positive electrode through an electrolyte, and forms a salt by bonding with the sulfur anion produced through the reduction reaction of sulfur. Specifically, sulfur before discharge has a cyclic $S_8$ structure, and this changes to lithium polysulfide ($Li_2S_x$, x=8, 6, 4, 2) through the reduction reaction, and when such lithium polysulfide is fully reduced, lithium sulfide ($Li_2S$) is eventually produced.

Due to low electrical conductivity of sulfur, a positive electrode active material, reactivity with electrons and lithium ions is difficult to secure in a solid-state form. In order to improve such reactivity of sulfur, conventional lithium-sulfur secondary batteries produce intermediate polysulfide in a $Li_2S_x$ form to induce a liquid-state reaction and improve reactivity. Herein, an ether-based solvent such as dioxolane or dimethoxyethane having high solubility for lithium polysulfide is used as a solvent of an electrolyte liquid. In addition, conventional lithium-sulfur secondary batteries build a catholyte-type lithium-sulfur secondary battery system to improve reactivity, and in this case, sulfur reactivity and lifetime properties are affected by the electrolyte liquid content due to properties of lithium polysulfide readily dissolved in the electrolyte liquid. In addition, lean electrolyte conditions are essential for high energy density, however, a lithium polysulfide concentration increases in the electrolyte liquid as the electrolyte liquid decreases making normal battery driving difficult due to a decrease in the active material mobility and an increase in the side reaction.

Such lithium polysulfide elution adversely affects battery capacity and lifetime properties, and various technologies for suppressing lithium polysulfide elution have been proposed.

As one example, Korean Patent Publication No. 2016-0037084 discloses that using a carbon nanotube aggregate having a three-dimensional structure coated with graphene as a carbon material may prevent lithium polysulfide from elution, and enhance conductivity of a sulfur-carbon nanotube composite.

In addition, Korean Patent No. 1379716 discloses that, by using a sulfur-including graphene composite, which is prepared through a method of treating graphene with hydrofluoric acid to form a pore on the graphene surface, and growing sulfur particles in the pore, as a positive electrode active material, lithium polysulfide elution is suppressed and as a result, a decrease in the battery capacity may be minimized.

By varying structures or materials of a sulfur-carbon composite used as a positive electrode active material, these patents have somewhat improved a problem of performance decline in a lithium-sulfur secondary battery through preventing lithium polysulfide elution, however, the effects are not sufficient. Accordingly, in order to build a lithium-sulfur secondary battery with high energy density, a battery system capable of driving a high loading and low porosity electrode is required, and studies on such a battery system have been continuously conducted in the art.

PRIOR ART DOCUMENTS

Patent Documents

Korean Patent Publication No. 2016-0037084 (2016 Apr. 5), SULFUR-CARBON NANOTUBE COMPLEX, METHOD OF PREPARING THE SAME, CATHODE ACTIVE MATERIAL FOR LITHIUM-SULFUR BATTERY INCLUDING THE SAME, AND LITHIUM-SULFUR BATTERY INCLUDING THE SAME Korean Patent No. 1379716 (2014 Mar. 25), LITHIUM-SULFUR SECONDARY BATTERY HAVING POSITIVE ELECTRODE WHICH IS CONSTRUCTED WITH GRAPHENE COMPOSITE INCLUDING SULFUR, AND A FORMING METHOD THEREOF

Non-Patent Documents

Abbas Fotouhi et al., Lithium-Sulfur Battery Technology Readiness and Applications-A Review, Energies 2017, 10, 1937

DISCLOSURE

Technical Problem

The inventors of the present invention have conducted various studies to solve the above problems, and as a result, have confirmed that a lithium-sulfur secondary battery having high energy density is obtained when including catalytic site-introduced sulfur as a positive electrode active material and adjusting a positive electrode and an electrolyte liquid to be under specific conditions, and have completed the present invention.

Accordingly, an aspect of the present invention provides a lithium-sulfur secondary battery having excellent energy density.

Technical Solution

According to an aspect of the present invention, there is provided a lithium-sulfur secondary battery including a positive electrode, a negative electrode, a separator, and an electrolyte liquid, wherein the positive electrode includes catalytic site-introduced sulfur, and has an SC factor value represented by the following Mathematical Formula 1 of 0.45 or greater:

$$SC \text{ factor} = \alpha \times \frac{L}{P} \quad \text{[Mathematical Formula 1]}$$

(in Mathematical Formula 1, P, L, and α follow descriptions provided in the present specification).

The catalytic site may comprise a transition metal composite.

The catalytic site may comprise at least one selected from the group consisting of iron phthalocyanine, nickel phthalocyanine, manganese phthalocyanine, copper phthalocyanine, cobalt phthalocyanine, and zinc phthalocyanine.

The catalytic site may be included in an amount of 0.1% by weight to 5% by weight based on a total weight of the catalytic site-introduced sulfur.

The catalytic site may be included in an amount of 0.05% by weight to 2.5% by weight based on a total weight of the positive electrode active material layer.

The catalytic site may be positioned on a surface or an inside of the sulfur.

The positive electrode may comprise a sulfur-carbon composite including a carbon material and the catalytic site-introduced sulfur on at least a part of an inside and a surface of the carbon material.

The electrolyte liquid includes a solvent and a lithium salt, and the solvent may include a first solvent having a $DV^2$ factor value represented by the following Mathematical Formula 2 of 1.75 or less and a second solvent that is a fluorinated ether-based solvent:

$$DV^2 \text{ factor} = \gamma \times \frac{\mu}{DV} \quad \text{[Mathematical Formula 2]}$$

(in Mathematical Formula 2, DV, μ, and γ follow descriptions provided in the present specification).

The first solvent may have a $DV^2$ factor value of 1.5 or less.

The lithium-sulfur secondary battery may have an NS factor value represented by the following Mathematical Formula 3 of 3.5 or less:

$$NS \text{ factor} = \frac{DV^2 \text{ factor}}{SC \text{ factor}} \quad \text{[Mathematical Formula 3]}$$

(in Mathematical Formula 3, SC factor, and $DV^2$ factor follow descriptions provided in the present specification).

The lithium-sulfur secondary battery may have an ED factor value represented by the following Mathematical Formula 4 of 950 or greater:

$$ED \text{ factor} = V \times SC \text{ factor} \times \frac{C}{D} \quad \text{[Mathematical Formula 4]}$$

(in Mathematical Formula 4, V, SC factor, C, and D follow descriptions provided in the present specification).

The first solvent may comprise at least one selected from the group consisting of propionitrile, dimethylacetamide, dimethylformamide, gamma-butyrolactone, triethylamine, and 1-iodopropane.

The second solvent may comprise at least one selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H,2'H-perfluorodipropyl ether.

The solvent may include the first solvent in an amount of 1% by weight to 50% by weight based on a total weight of the solvent.

The solvent may include the second solvent in an amount of 50% by weight to 99% by weight based on a total weight of the solvent.

The solvent may include the first solvent and the second solvent in a weight ratio of 3:7 to 1:9.

Advantageous Effects

By adjusting a positive electrode and an electrolyte liquid to be under specific conditions, a lithium-sulfur secondary battery according to the present invention exhibits high energy density that has been difficult to obtain with conventional lithium-sulfur secondary batteries.

BEST MODE

Figure 1:
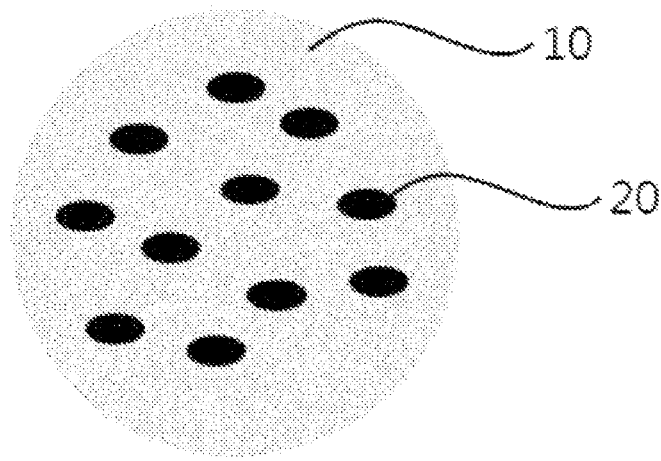
FIG. 1 is a mimetic diagram illustrating catalytic site-introduced sulfur according to one embodiment of the present invention.

Hereinafter, the present invention will be described in more detail.

Terms or words used in the present specification and the claims are not to be interpreted limitedly to common or dictionary meanings, and shall be interpreted as meanings and concepts corresponding to technological ideas of the present invention based on a principle in which the inventors may suitably define the concepts of terms in order to describe the invention in the best possible way.

Terms used in the present invention are for describing specific embodiments only and do not intend to limit the present inventive. Singular forms used herein include plural forms as well, unless the context clearly indicates otherwise. In the present invention, terms such as 'include' or 'have' are to specify the presence of features, numbers, steps, behaviors, constituents, components or combinations thereof described in the specification, and need to be construed as not excluding the possibility of presence or addition of one or more of other features, numbers, steps, behaviors, constituents, components or combinations thereof in advance.

The term "composite" used in the present specification means a material combining two or more materials, and exhibiting more effective functions while forming physically and chemically different phases.

The term "polysulfide" used in the present specification is a concept including both "polysulfide ion ($S_x^{2-}$, x=8, 6, 4, 2))" and "lithium polysulfide ($Li_2S_x$ or $LiS_x^-$ x=8, 6, 4, 2)".

For properties described in the present specification, when measuring condition and method are not specifically described, the properties are measured using measuring conditions and methods generally used by those skilled in the art.

A lithium-sulfur secondary battery has high discharge capacity and energy density among various lithium secondary batteries, and has received attention as a next-generation secondary battery with an advantage of sulfur used as a positive electrode active material being abundant in resources and low-priced lowering manufacturing costs of the battery, and being environmental-friendly.

However, in conventional lithium-sulfur secondary battery systems, the lithium polysulfide elution described above is not able to be suppressed causing sulfur loss, and as a result, theoretical discharge capacity and theoretical energy density are not fully obtained in actual driving since the amount of sulfur participating in an electrochemical reaction rapidly decreases. In addition, as well as being floated or precipitated in an electrolyte liquid, the lithium polysulfide eluted as above directly reacts with lithium, and is fixed on a negative electrode surface in a $Li_2S$ form causing a problem of corroding a lithium metal negative electrode.

In the prior art, methods of introducing a material capable of suppressing lithium polysulfide elution to a positive electrode or a separator in an additive or protective layer form, changing a structure or material of a positive electrode active material, changing an electrolyte composition, and the like have been proposed. However, an effect of improving lithium polysulfide elution has been insignificant, and there are also disadvantages of having a limitation in the amount of sulfur, a positive electrode active material, to introduce (that is, loading amount), and causing a serious problem in battery stability or being inefficient in terms of process.

In view of the above, a lithium secondary battery according to one embodiment of the present invention, which comprises a positive electrode, a negative electrode, a separator, and an electrolyte liquid, includes a positive electrode having low positive electrode active material layer porosity and high sulfur loading amount using catalytic site-introduced sulfur as the positive electrode active material.

When lowering porosity of positive electrode and increasing loading amount of sulfur, energy density of a secondary battery including the same generally increases. However, when lowering porosity of a positive electrode to a minimum and increasing loading amount of sulfur to a maximum in a lithium-sulfur secondary battery, a ratio of an electrolyte liquid per unit sulfur content decreases, and as a result, target performance is difficult to obtain when using the above-described positive electrode in the lithium-sulfur secondary battery.

Accordingly, the present invention provides a lithium-sulfur secondary battery having higher energy density compared to conventional lithium-sulfur secondary batteries during actual operation by using, in order to enhance a reaction rate (kinetic) of an electrochemical reaction of sulfur that is a positive electrode active material when charging and discharging the lithium-sulfur secondary battery, catalytic site-introduced sulfur and specifying a sulfur-related condition in the positive electrode. In addition, by adjusting an electrolyte liquid to satisfy a specific condition in addition to the above-described constitution, the effect of enhancing energy density described above is further enhanced.

The positive electrode according to the present invention may include a positive electrode current collector, and a positive electrode active material layer formed on one surface or both surfaces of the positive electrode current collector.

The positive electrode current collector is not particularly limited as long as it supports a positive electrode active material layer, and has high conductivity without inducing chemical changes to the corresponding battery. For example, copper, stainless steel, aluminum, nickel, titanium, palladium, baked carbon, copper or stainless steel of which surface is treated with carbon, nickel, silver or the like, aluminum-cadmium alloys and the like may be used.

The positive electrode current collector may strengthen binding strength with the positive electrode active material by forming micro unevenness on a surface thereof, and various forms such as films, sheets, foil, meshes, nets, porous bodies, foams, or non-woven fabrics may be used.

The thickness of the positive electrode current collector is not particularly limited, but may be, for example, from 3 μm to 500 μm.

The positive electrode active material layer may include a positive electrode active material, and selectively, a conductive additive, and a binder.

In the present invention, the positive electrode active material includes catalytic site-introduced sulfur, and the catalytic site-introduced sulfur includes a catalytic site, which has a catalytic effect on the reduction reaction of sulfur, in sulfur. The catalytic site includes a transition metal composite, and may be referred to as a catalytic site since catalytic activity for a reaction rate of the reduction reaction of sulfur may be controlled by the transition metal composite.

Hereinafter, the catalytic site-introduced sulfur according to the present invention will be described in more detail with reference to a drawing.

FIG. 1 is a mimetic diagram illustrating catalytic site-introduced sulfur according to one embodiment of the present invention.

When referring to FIG. 1, the catalytic site-introduced sulfur according to one embodiment of the present invention may include a sulfur particle 10; and a catalytic site 20 added to the sulfur particle.

The sulfur (sulfur particle 10 of FIG. 1) may include at least one selected from the group consisting of inorganic sulfur ($S_8$) and sulfur-based compounds. The sulfur-based compound may be at least one selected from the group consisting of $Li_2S_n$ (n≥1), disulfide compounds such as 2,5-dimercapto-1,3,4-thiadiazole or 1,3,5-trithiocyanuic acid, organosulfur compounds, and carbon-sulfur polymers $((C_2S_x)_n$, x=2.5 to 50, n≥2). Preferably, inorganic sulfur ($S_8$) may be used.

The catalytic site 20 is a transition metal composite formed by a nitrogen atom bonding to a transition metal, and performs a role of a catalyst for the reduction reaction of sulfur to enhance a reaction rate (kinetic).

The catalytic site 20 includes a transition metal composite including a bond between a transition metal and a nitrogen atom, and furthermore, the catalytic site 20 includes a bond between a transition metal and a nitrogen atom and a bond between the nitrogen atom and a carbon atom. In the catalytic site 20, the transition metal composite preferably includes a transition metal and four nitrogen atoms bonding to the transition metal. When the number of nitrogen atoms bonding to the transition metal is less than 4, activity as a catalyst may be reduced, and when the number is greater than 4, structural stability decreases causing concern for a decrease in the catalytic activity. When nitrogen bonds to a transition metal as above, excellent catalytic properties are obtained as well as having a stable structure, and as a result, very high stability and catalytic effect may be obtained compared to a catalytic site formed by atoms other than nitrogen bonding to a transition metal.

The catalytic site 20 may include at least one of transition metals selected from the group consisting of iron (Fe), nickel (Ni), manganese (Mn), copper (Cu), cobalt (Co), and zinc (Zn), but is not limited thereto as long as it is a transition metal capable of having catalytic activity for the reduction reaction of sulfur.

Specifically, the catalytic site 20 is a metal-phthalocyanine (MePc), and examples thereof may include iron phthalocyanine (FePc), nickel phthalocyanine (NiPc), manganese phthalocyanine (MnPc), copper phthalocyanine (CuPc), cobalt phthalocyanine (CoPc), zinc phthalocyanine (ZnPc) and the like.

In the catalytic site 20, the transition metal and the nitrogen may have a molar ratio of 1:2 to 10, preferably 1:2 to 8 and more preferably 1:3 to 5. When the molar ratio is less than the above-mentioned range, the catalytic site is not able to be sufficiently doped on the sulfur particle 10 as needed, and when the molar ratio is greater than the above-mentioned range, the amount of the nitrogen per unit weight of the sulfur particle 10 increases, which may reduce catalytic activity.

The catalytic site 20 is a molecular level composite having a size of 0.1 nm to 1 nm, preferably 0.1 nm to 0.9 nm and more preferably 0.1 nm to 0.8 nm, and allows to maintain natural properties of the sulfur particle 10 itself even when added to the sulfur particle 10.

The catalytic site 20 may be positioned on the surface or the inside of the sulfur particle 10. Preferably, the catalytic site 20 may be added to the inside of the sulfur particle 10 by mutual attraction with the sulfur.

The catalytic site 20 may be included in an amount of 0.1% by weight to 5% by weight and preferably in an amount of 0.2% by weight to 1% by weight based on the total weight of the catalytic site-introduced sulfur of the present invention. When the catalytic site 20 content is outside the above-mentioned range, an effect of enhancing a reaction rate of the reduction reaction of sulfur is reduced, and a battery performance enhancing effect may be insignificant or no longer increases.

In addition, the catalytic site 20 may be included in an amount of 0.05% by weight to 2.5% by weight and preferably in an amount of 0.1% by weight to 0.5% by weight based on the total weight of the positive electrode active material layer of the present invention. When the catalytic site 20 content is less than the above-mentioned range, a catalytic reaction may decline. When the catalytic site 20 content is greater than the above-mentioned range on the contrary, unnecessary side reactions may occur.

Particularly, by using the catalytic site-introduced sulfur described above as the positive electrode active material in the present invention, a reaction rate of the reduction reaction of sulfur is enhanced and as a result, high performance of a lithium-sulfur secondary battery including the same may be achieved. In addition, a catalytic site including a relatively low-priced transition metal instead of high priced platinum (Pt) that has been used as conventional electrochemical catalyst in the art is added to sulfur, which is advantageous for commercialization due to low costs. In addition, by securing solid-solid (solid-state) reactivity between sulfur and an electrolyte liquid in an electrolyte liquid-including lithium-sulfur secondary battery system to describe later, enhanced discharge capacity properties are obtained in the lithium-sulfur secondary battery, and high energy density is accomplished in the lithium-sulfur secondary battery.

The catalytic site-introduced sulfur used as the positive electrode active material in the present invention does not have electric conductivity by itself, and therefore, is composited with a carbon material, a conductive material. Preferably, the positive electrode active material may be a sulfur-carbon composite including the catalytic site-introduced sulfur and a carbon material.

The sulfur-carbon composite may include a carbon material and the catalytic site-introduced sulfur on at least a part of an inside and a surface of the carbon material.

In the sulfur-carbon composite, the carbon material provides a skeleton capable of uniformly and stably fixing the catalytic site-introduced sulfur described above, and allows an electrochemical reaction to smoothly progress by compensating low electrical conductivity of sulfur.

The carbon material may be generally prepared by carbonizing a precursor made of various carbon materials. The carbon material includes pores that are not constant on the inside. The pores have an average diameter in a range of 1 nm to 200 nm, and the porosity may be in a range of 10% to 90% of the total porous volume. When the pores have an average diameter of less than the above-mentioned range, the pore size is merely a molecular level making sulfur impregnation impossible, and when the pores have an average diameter of greater than the above-mentioned range, the porous carbon has weakened mechanical strength, which is not preferred to use in an electrode preparation process.

The carbon material is prepared by carbonizing a precursor made of various carbon materials, and is not limited as long as it is commonly used in the art. For example, the porous carbon material may be at least one selected from the group consisting of graphite; graphene; reduced graphene oxide (rGO); carbon black such as denka black, acetylene black, ketjen black, channel black, furnace black, lamp black or thermal black; carbon nanotubes (CNT) such as single-walled carbon nanotubes (SWCNT) or multi-walled carbon nanotubes (MWCNT); carbon fibers such as graphite nanofibers (GNF), carbon nanofibers (CNF) or activated carbon fibers (ACF); graphite such as natural graphite, artificial graphite or expanded graphite, and activated carbon, but is not limited thereto.

The form of the carbon material may be a globular type, a rod type, a needle type, a plate type, a tube type, or a bulk type, and may be used without limit as long as it is commonly used in the art.

The pores formed in the carbon material are formed to have a partially open shape, and inside the pores, the positive electrode active material, specifically, the catalytic site-introduced sulfur described above, may be supported.

The carbon material may be a particle having an average particle diameter of 1 μm to 50 μm and preferably 5 μm to 30 μm. When the average particle diameter is less than the above-mentioned range, lithium ion transfer efficiency may be reduced due to penetration and wetting of an electrolyte liquid, and when the average particle diameter is greater than the above-mentioned range, the volume may increase by increasing electrode pores with respect to the electrode weight.

In addition, the carbon material having an increased specific surface area is advantageous in terms of reactivity with sulfur and an electrolyte liquid, and specifically, the specific surface area may be from 100 m²/g to 1200 m²/g and preferably from 150 m²/g to 500 m²/g. When the specific surface area is less than the above-mentioned range, reactivity may decrease due to a decrease in the contact area with sulfur, and the specific surface area being greater than the above-mentioned range may have problems of an increase in the side reaction caused by the excessive specific surface area and increasing an added amount of a binder required for preparing positive electrode slurry.

In the sulfur-carbon composite, the catalytic site-introduced sulfur and the carbon material may be simply mixed to be composited, or may have a core-shell-structured coating form or a supported form. The core-shell-structured coating form means any one of the catalytic site-introduced sulfur or the carbon material coating the other material, and may be, for example, the carbon material surface being covered by the catalytic site-introduced sulfur or vice versa. In addition, the supported form may be a form of supporting the catalytic site-introduced sulfur inside the pore of the carbon material. The sulfur-carbon composite may have any form as long as it satisfies the content ratio of the catalytic site-introduced sulfur to describe later and the carbon material, and the form is not limited in the present invention.

In the sulfur-carbon composite, the catalytic site-introduced sulfur may be included in an amount of 50% by weight to 90% by weight and preferably in an amount of 60% by weight to 80% by weight based on the total sulfur-carbon composite weight.

In the sulfur-carbon composite, the carbon material may be included in an amount of 10% by weight to 50% by weight and preferably in an amount of 20% by weight to 40% by weight based on the total sulfur-carbon composite weight.

Accordingly, a weight ratio of the carbon material and the catalytic site-introduced sulfur may be from 1:1 to 1:9 and preferably from 1:1.5 to 1:4 in the sulfur-carbon composite. When the weight ratio is less than the above-mentioned range, an added amount of a binder required for preparing positive electrode slurry increases as the carbon material content increases. Such an increase in the added amount of a binder resultantly increases sheet resistance of an electrode performing a role of an insulator preventing electron migration (electron pass), and cell performance may decline therefrom. On the contrary, when the weight ratio is greater than the above-mentioned range, the catalytic site-introduced sulfurs aggregate by themselves, and direct participation in an electrode reaction may become difficult since the sulfur is difficult to receive electrons.

Next, a method for preparing the sulfur-carbon composite including the catalytic site-introduced sulfur according to the present invention will be described.

Specifically, the method for preparing the sulfur-carbon composite including the catalytic site-introduced sulfur includes (S1) preparing catalytic site-introduced sulfur by mixing sulfur, a transition metal composite, and a solvent; (S2) adding and mixing a carbon material to the catalytic site-introduced sulfur obtained in (S1); (S3) filtering the mixture obtained in (S2); (S4) drying powder obtained from filtering the mixture after (S3), and (S5) compositing the powder obtained in (S4).

In (S1), a transition metal composite including a transition metal and nitrogen, sulfur, and a solvent may be mixed to prepare catalytic site-introduced sulfur. Preferably, the catalytic site-introduced sulfur may be prepared by mixing the transition metal composite, the sulfur and the solvent, and then ball milling the result.

The sulfur used in (S1) is the same as the sulfur described above.

The transition metal composite is a metal-phthalocyanine (MePC), and specific types thereof are as described above.

The metal-phthalocyanine is one type of macrocyclic compound having a structure in which rings of nitrogen atom-carbon atom cross, and has a chemical structure in which a metal ion coordinates at the center. Since the metal-phthalocyanine is used as a catalytic site, a catalytic site including a transition metal composite having a stable structure with four nitrogen atoms bonding to a transition metal may be prepared. In order to bond four nitrogen atoms to a transition metal, a multistep process such as reacting with a precursor material including a nitrogen atom and progressing an additional reaction under the ammonia ($NH_3$) atmosphere needs to be generally conducted. However, by using a metal-phthalocyanine having the chemical structure as described above as the transition metal composite in the present invention, a catalytic site including a transition metal composite having a stable structure with four nitrogen atoms bonding to a transition metal as described above may be prepared.

The solvent used in (S1) may be at least one of solvents selected from the group consisting of deionized water, dimethyl carbonate, dimethylformamide, N-methylformamide, sulfolane (tetrahydrothiophene-1,1-dioxide), 3-methylsulfolane, N-butyl sulfone, dimethyl sulfoxide, pyrrolidinone (HEP), dimethyl piperidone (DMPD), N-methyl pyrrolidinone (NMP), N-methylacetamide, dimethylacetamide (DMAc), N,N-dimethylformamide (DMF), diethylacetamide (DEAc) dipropylacetamide(DPAc), ethanol, propanol, butanol, hexanol, ethylene glycol, tetrachloroethylene, propylene glycol, toluene, turpentine, methyl acetate, ethyl acetate, petroleum ether, acetone, cresol, and glycerol, and preferably, the transition metal composite may have high solubility when using at least one of solvents selected from the group consisting of deionized water, ethanol, N,N-dimethylformamide, and N-methyl pyrrolidinone as the solvent.

Herein, the amounts of the catalytic site and the sulfur may be properly controlled during the preparation process so that each content thereof satisfies the weight range as described above in the prepared catalytic site-introduced sulfur.

Subsequently, in (S2), a carbon material may be added and mixed to the catalytic site-introduced sulfur obtained in (S1).

The carbon material used in (S2) is the same as described above.

The mixing in (S2) is for increasing the degree of mixing of the catalytic site-introduced sulfur and the carbon material, and methods commonly used in the art may be used. Preferably, the catalytic site-introduced sulfur and the carbon material may be mixed using a ball milling process. Herein, the mixing time and rate may also be selectively adjusted depending on the content and the condition of the raw materials.

Herein, the amounts of the catalytic site-introduced sulfur and the carbon material may be properly controlled during the preparation process so that each content thereof satisfies the weight range as described above in the prepared sulfur-carbon composite.

Subsequently, in (S3), the mixture obtained in (S2) may be filtered to remove impurities. As the filtration, general filtration methods such as a vacuum pump may be applied, and after conducting the filtration process, a washing process using an alcohol such as ethanol may be additionally conducted as necessary.

Subsequently, in (S4), a process of drying powder of the mixture obtained from the filtration of (S3) may be conducted.

For example, the drying may be conducted for 10 hours to 14 hours, preferably for 10.5 hours to 13.5 hours, and more preferably for 11 hours to 13 hours at a temperature of 60° C. to 100° C., preferably 65° C. to 95° C., and more preferably 70° C. to 90° C.

Subsequently, in (S5), the powder obtained in (S4) may be composited, and as a result, the sulfur-carbon composite including the catalytic site-introduced sulfur according to the present invention may be finally prepared.

The composition method is not particularly limited in the present invention, and methods commonly used in the art may be used. For example, methods commonly used in the art such as dry composition or wet composition such as spray coating may be used.

The conductive additive included in the positive electrode active material layer is a material connecting an electrolyte liquid and the positive electrode active material to perform a role of a path through which electrons migrate from a current collector to the positive electrode active material, and materials having conductivity may be used without limit.

For example, as the conductive additive, carbon black such as Super-P, denka black, acetylene black, ketjen black, channel black, furnace black, lamp black, thermal black or carbon black; carbon derivatives such as carbon nanotubes, graphene or fullerene; conductive fibers such as carbon fiber or metal fibers; fluorocarbon, aluminum and metal powders such as nickel powder; or conductive polymers such as polyaniline, polythiophene, polyacetylene, or polypyrrole may be used either alone or as a mixture.

The conductive additive may be added in an amount of 0.01% by weight to 30% by weight based on the total positive electrode active material layer weight.

The binder is for keeping the positive electrode active material on the positive electrode current collector, and organically linking the positive electrode active materials to further increase binding force between them, and all binders known in the art may be used.

Example of the binder may include one type selected from the group consisting of fluorine resin-based binders including polyvinylidene fluoride (PVdF) Or polytetrafluoroethylene (PTFE); rubber-based binders including styrene butadiene rubber (SBR), acrylonitrile-butadiene rubber or styrene-isoprene rubber; cellulose-based binders including carboxyl methyl cellulose (CMC), starch, hydroxypropyl cellulose or regenerated cellulose; polyalcohol-based binders; polyolefin-based binders including polyethylene or polypropylene; polyimide-based binders; polyester-based binders; and silane-based binders, or mixtures or copolymers of two or more types thereof.

The binder may be added in an amount of 0.5% by weight to 30% by weight based on the total positive electrode active material layer weight. When the binder content is less than 0.5% by weight, physical properties of the positive electrode decline eliminating the active material and the conductive additive in the positive electrode, and when the content is greater than 30% by weight, a ratio of the active material and the conductive additive relatively decreases in the positive electrode reducing battery capacity.

The positive electrode may be prepared using common methods known in the art. For example, the positive electrode may be prepared by preparing slurry by mixing a solvent, and, as necessary, additives such as a binder, a conductive additive and a filler to a positive electrode active material and stirring the result, then coating the slurry on a current collector made of a metal material, and compressing and drying the result.

Specifically, the binder is dissolved in a solvent for preparing slurry first, and then a conductive additive is dispersed thereinto. As the solvent for preparing the slurry, those capable of uniformly dispersing the positive electrode active material, the binder and the conductive additive and readily evaporating are preferably used, and typical examples thereof may include acetonitrile, methanol, ethanol, tetrahydrofuran, water, isopropyl alcohol and the like. Next, the positive electrode active material, or selectively together with the additives, may be uniformly dispersed again in the conductive additive-dispersed solvent to prepare positive electrode slurry. The amounts of the solvent, the positive electrode active material, or, selectively, the additives included in the slurry do not carry an important meaning in the present application, and it is sufficient that the slurry has proper viscosity to be readily coated. The slurry prepared as above may be coated on a current collector, and dried to form a positive electrode. The slurry may be coated on a current collector to a proper thickness depending on the slurry viscosity and the thickness of the positive electrode to form.

The coating may be conducted using methods commonly known in the art, and for example, the positive electrode active material slurry may be distributed on an upper surface of one side of the positive electrode current collector, and uniformly dispersing the slurry using a doctor blade or the like. In addition thereto, the coating may be conducted using a method such as die casting, comma coating, or screen printing.

The drying is not particularly limited, but may be conducted within 1 day in a vacuum oven of 50° C. to 200° C.

The positive electrode of the present invention prepared using the above-described compositions and method is classified by an SC factor value represented by the following Mathematical Formula 1.

$$SC\ factor = \alpha \times \frac{L}{P} \qquad \text{[Mathematical Formula 1]}$$

(In Mathematical Formula 1,

P is porosity (%) of the positive electrode active material layer in the positive electrode, L is a mass of sulfur per unit area (mg/cm$^2$) of the positive electrode active material layer in the positive electrode, and α is 10 (constant)).

The lithium-sulfur secondary battery according to the present invention accomplishes high energy density by an organic binding of, as well as the positive electrode described above, a negative electrode, a separator, an electrolyte and the like, and according to the present invention, in order for the lithium-sulfur secondary battery to accomplish high energy density, the SC factor value may be 0.45 or greater and preferably 0.5 or greater. Although an upper limit of the SC factor value is not particularly limited in the present invention, the SC factor value may be 4.5 or less when considering actual operation of the lithium-sulfur secondary battery. In conventional lithium-sulfur secondary batteries, performance such as energy density of the battery declines when the SC factor value is 0.45 or greater, however, in the lithium-sulfur secondary battery according to the present invention, battery performance is maintained without declining in actual driving.

The negative electrode according to the present invention may be formed with a negative electrode current collector, and a negative electrode active material layer formed on one surface or both surfaces thereof. Alternatively, the negative electrode may be a lithium metal plate.

The negative electrode active material layer may include a negative electrode active material, and selectively, a conductive additive, and a binder.

As the negative electrode active material, a material capable of reversibly intercalating or deintercalating lithium ions, a material capable of reversibly forming a lithium-containing compound by reacting with lithium ions, lithium metal or a lithium alloy may be used.

Examples of the material capable of reversibly intercalating or deintercalating lithium ions may include crystalline carbon, amorphous carbon or a mixture thereof.

Examples of the material capable of reversibly forming a lithium-containing compound by reacting with lithium ions may include tin oxide, titanium nitrate or silicon.

Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

As for constitutions of the current collector, the conductive additive, the binder and the like other than the negative electrode active material and a method for preparing a negative electrode, the materials, the methods and the like used in the positive electrode described above may be used.

The separator according to the present invention is a physical separator having a function of physically separating the positive electrode and the negative electrode, and is not particularly limited as long as it is used as a common separator, and those having an excellent electrolyte liquid moisture-containing ability while having low resistance for ion migration of the electrolyte liquid are particularly preferred.

In addition, the separator enables lithium ion transport between the positive electrode and the negative electrode while separating or insulating the positive electrode and the negative electrode from each other. Such a separator may be formed with porous, that is, 30% to 50% porosity, and non-conductive or insulating materials.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used, or non-woven fabrics made of high melting point glass fiber or the like may be used. Among these, a porous polymer film is preferably used.

When using a polymer film as both a buffer layer and the separator, the amount of electrolyte liquid impregnation and ion conducting properties decline, and effects of reducing an overpotential and improving capacity properties become insignificant. Meanwhile, when using a non-woven fabric material as the both, mechanical strength is not secured causing a battery short circuit problem. However, when using a film-type separator and a polymer non-woven fabric buffer layer together, mechanical strength may also be secured together with an effect of improving battery performance obtained by employing the buffer layer.

Preferably, in the present invention, an ethylene homopolymer (polyethylene) polymer film may be used as the separator, and a polyimide non-woven fabric may be used as the buffer layer. Herein, the polyethylene polymer film preferably may have a thickness of 10 μm to 25 μm and porosity of 40% to 50%.

The electrolyte liquid according to the present invention is, as a non-aqueous electrolyte liquid including a lithium salt, formed with a lithium salt and a solvent. The electrolyte liquid has density of less than 1.5 g/cm$^3$. When the electrolyte liquid has density of 1.5 g/cm$^3$ or greater, the lithium-sulfur secondary battery is difficult to accomplish high energy density due to a weight increase in the electrolyte liquid.

The lithium salt is a material that may be readily dissolved in a non-aqueous organic solvent, and examples thereof may include at least one selected from the group consisting of LiCl, LiBr, LiI, LiClO$_4$, LiBF$_4$, LiB$_{10}$Cl$_{10}$, LiB (Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC (CF$_3$SO$_2$)$_3$, LiN (CF$_3$SO$_2$)$_2$, LiN (C$_2$F$_5$SO$_2$)$_2$, LiN (SO$_2$F)$_2$, chloroborane lithium, lower aliphatic carboxylic acid lithium, and lithium imide. In one embodiment of the present invention, the lithium salt may be preferably lithium imide such as LiTFSI.

The concentration of the lithium salt may be from 0.1 M to 8.0 M, preferably from 0.5 M to 5.0 M and more preferably from 1.0 to 3.0 M depending on various factors such as an accurate composition of the electrolyte liquid mixture, solubility of the salt, conductivity of the dissolved salt, charge and discharge conditions of a battery, a working temperature, and other factors known in the lithium secondary battery field. When the concentration of the lithium salt is less than the above-mentioned range, conductivity of the electrolyte liquid may decrease causing decline in the battery performance, and when the concentration of the lithium salt is greater than the above-mentioned range, viscosity of the electrolyte liquid increases leading to a decrease in the lithium ion (Lit) mobility, and therefore, a proper concentration is preferably selected in the above-mentioned range.

The solvent includes a first solvent and a second solvent. The first solvent has a highest dipole moment per unit volume among the constituents included in an amount of 1% by weight or greater in the solvent, and accordingly, has high dipole moment and low viscosity. Using a solvent with a high dipole moment is effective in improving solid-state reactivity of sulfur, and such an effect may be favorably obtained when the solvent itself has low viscosity. In the present invention, the first solvent is classified by a DV$^2$ factor represented by the following Mathematical Formula 2.

$$DV^2 \text{ factor} = \gamma \times \frac{\mu}{DV} \quad \text{[Mathematical Formula 2]}$$

(In Mathematical Formula 2,
DV is a dipole moment per unit volume (D·mol/L),
μ is viscosity of the solvent (cP, 25° C.), and
γ is 100 (constant)).

According to the present invention, the DV$^2$ factor value may be 1.75 or less, and preferably 1.5 or less. Although a lower limit of the DV$^2$ factor value is not particularly limited in the present invention, the DV$^2$ factor value may be 0.1 or greater when considering actual operation of the lithium-sulfur secondary battery. When mixing a solvent having a $DV^2$ factor value of 1.75 or less such as the first solvent, battery performance does not decline even when using a positive electrode having low porosity and having a high loading amount of sulfur, a positive electrode active material, in a lithium-sulfur battery since functionality of an electrolyte liquid may be maintained the same.

In the present invention, the first solvent is not particularly limited in the type as long as it has the $DV^2$ factor value included in the above-mentioned range, but may include at least one selected from the group consisting of propionitrile, dimethylacetamide, dimethylformamide, gamma-butyrolactone, triethylamine and 1-iodopropane.

The first solvent may be included in an amount of 1% by weight to 50% by weight, preferably in an amount of 5% by weight to 40% by weight and more preferably in an amount of 10% by weight to 30% by weight based on the total weight of the solvent forming the electrolyte liquid. When the solvent according to the present invention includes the first solvent in the above-described % by weight range, an effect of improving battery performance may be obtained even when using together with a positive electrode having low porosity and a high loading amount of sulfur, a positive electrode active material.

The lithium-sulfur secondary battery of the present invention is further classified by an NS factor combining the SC factor and the $DV^2$ factor. The NS factor is represented by the following Mathematical Formula 3.

$$NS \text{ factor} = \frac{DV^2 \text{ factor}}{SC \text{ factor}} \quad \text{[Mathematical Formula 3]}$$

(In Mathematical Formula 3,

SC factor has the same value as defined in Mathematical Formula 1, and $DV^2$ factor has the same value as defined in Mathematical Formula 2).

In the present invention, the NS factor value may be 3.5 or less, preferably 3.0 or less and more preferably 2.7 or less. Although a lower limit of the NS factor value is not particularly limited in the present invention, the NS factor value may be 0.1 or greater when considering actual operation of the lithium-sulfur secondary battery. When the NS factor value is adjusted to be in the above-mentioned range, an effect of improving performance of the lithium-sulfur secondary battery may be more superior.

In the present invention, the second solvent is a fluorinated ether-based solvent. In order to control viscosity of an electrolyte liquid in the prior art, solvents such as dimethoxyethane and dimethyl carbonate have been used as a diluent, and when using such a solvent as a diluent, a battery including a high loading and low porosity positive electrode as in the present invention may not be driven. Accordingly, in the present invention, the second solvent is added with the first solvent in order to drive the positive electrode according to the present invention. The second solvent is not particularly limited in the type as long as it is a fluorinated ether-based solvent generally used in the art, but may include at least one selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H,2'H-perfluorodipropyl ether.

The second solvent may be included in an amount of 50% by weight to 99% by weight, preferably in an amount of 60% by weight to 95% by weight and more preferably in an amount of 70% by weight to 90% by weight based on the total weight of the solvent forming the electrolyte liquid. When the solvent according to the present invention includes the second solvent in the above-described % by weight range, an effect of improving battery performance may be obtained even when using together with a positive electrode having low porosity and a high loading amount of sulfur, a positive electrode active material, like the first solvent. When mixing the first solvent and the second solvent, the second solvent may be included in the electrolyte liquid in the same or more amount compared to the first solvent considering a battery performance improving effect. According to the present invention, the solvent may include the first solvent and the second solvent in a weight ratio of 1:1 to 1:9 and preferably 3:7 to 1:9 (first solvent:second solvent).

The non-aqueous electrolyte liquid for a lithium-sulfur battery of the present invention may further include a nitrate or nitrite-based compound as an additive. The nitrate or nitrite-based compound is effective in forming a stable film on the lithium electrode and enhancing charge and discharge efficiency. Such a nitrate or nitrite-based compound is not particularly limited in the present invention, however, one type selected from the group consisting of inorganic-based nitrate or nitrite compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$) and nitrite ammonium ($NH_4NO_2$); organic-base nitrate or nitrite compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite and octyl nitrite; organic nitro compounds such as nitromethane, nitropropane, nitrobutane, nitrobenzene, dinitrobenzene, nitro pyridine, dinitropyridine, nitrotoluene and dinitrotoluene, and combinations thereof may be used, and preferably, lithium nitrate is used.

In addition, the electrolyte liquid may further include other additives with the purpose of improving charge and discharge properties, flame retardancy and the like. Examples of the additive may include pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoroethylene carbonate (FEC), propene sultone (PRS), vinylene carbonate (VC) and the like.

The lithium-sulfur secondary battery according to the present invention is classified by an ED factor value represented by the following Mathematical Formula 4.

$$ED \text{ factor} = V \times SC \text{ factor} \times \frac{C}{D} \quad \text{[Mathematical Formula 4]}$$

(In Mathematical Formula 4,

V is a discharge nominal voltage (V) for $Li/Li^+$,

SC factor has the same value as defined in Mathematical Formula 1,

C is discharge capacity (mAh/g) when discharging at a 0.1 C rate, and

D is density ($g/cm^3$) of the electrolyte liquid).

The ED factor may accomplish high energy density in an actual lithium-sulfur secondary battery as the value is higher. According to the present invention, the ED factor value may be 950 or greater, preferably 1100 or greater and more preferably 1150 or greater. Although an upper limit of the ED factor value is not particularly limited in the present invention, the ED factor value may be 10000 or less when considering actual operation of the lithium-sulfur secondary battery. The ED factor value range means that the lithium-sulfur secondary battery according to the present invention is capable of obtaining more enhanced energy density compared to conventional lithium-sulfur secondary batteries.

The lithium-sulfur secondary battery of the present invention may be manufactured by disposing a separator between a positive electrode and a negative electrode to form an electrode assembly, placing the electrode assembly in a cylindrical battery case or an angular battery case, and then injecting an electrolyte thereto. Alternatively, the lithium-sulfur secondary battery of the present invention may also be manufactured by laminating the electrode assembly, impregnating the electrode assembly into an electrolyte, and placing the obtained result in a battery case and sealing the result.

In addition, the present invention provides a battery module including the lithium-sulfur secondary battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

Mode for Invention

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

EXAMPLE AND COMPARATIVE EXAMPLE

Example 1

After mixing ethanol (200 ml), sulfur ($S_8$) (38 g) and iron phthalocyanine (FePc, product of Sigma Aldrich) (150 mg), a catalytic site, the result was ball milled for 3 hours to prepare sulfur having iron phthalocyanine (FePc) introduced as a catalytic site (FePc-S).

Subsequently, to the catalytic site-introduced sulfur (FePc-S) prepared above, a carbon nanotube (product of CNano Technology) (13.5 g) was added, and the result was ball milled for 3 hours to obtain a mixture.

Then, the mixture prepared above was filtered using a vacuum pump and then washed with ethanol (1000 ml), and upper layer powder of the mixture obtained from the filtration and the washing was dried for 12 hours at 80° C. to prepare a sulfur-carbon mixture.

Subsequently, the sulfur-carbon mixture prepared above was left in a 155° C. oven for 30 minutes to be composited, and as a result, a sulfur-carbon composite (S/C 70:30 weight ratio) was prepared.

The sulfur-carbon composite prepared above, a conductive additive and a binder were mixed to prepare slurry for forming a positive electrode active material layer. Herein, vapor grown carbon fiber was used as the conductive additive, and styrene butadiene rubber/carboxymethyl cellulose (SBR/CMC 7:3) was used as a binder. The mixing ratio herein was employed such that the sulfur-carbon composite:the conductive additive:the binder was 90:5:5 in a weight ratio.

The slurry prepared as above was coated on an aluminum foil current collector having a thickness of 20 μm, and then dried to prepare a positive electrode (energy density of positive electrode: 4.3 mAh/cm$^2$). In the prepared positive electrode, porosity of the positive electrode active material layer calculated based on the measurements of electrode weight and electrode thickness (using a TESA-pHITE device of TESA) was 60%, and the sulfur mass per unit area of the positive electrode active material layer was 3.0 mg/cm$^2$. The SC factor value calculated based thereon was 0.5.

The positive electrode prepared using the above-described method and a negative electrode were placed to face each other, and a separator was interposed therebetween to prepare an electrode assembly. Herein, lithium foil having a thickness of 60 μm was used as the negative electrode, and polyethylene having a thickness of 20 μm and porosity of 45% was used as the separator.

Subsequently, the electrode assembly was placed inside a case, and an electrolyte liquid was injected thereto to manufacture a lithium-sulfur secondary battery. Herein, the electrolyte liquid was prepared by dissolving lithium bis(trifluoromethylsulfonyl)imide (LiTFSI) having a 3 M concentration in an organic solvent, and as the organic solvent herein, a solvent obtained by mixing propionitrile (first solvent) and 1H,1H,2'H,3H-decafluorodipropyl ether (second solvent) in a 3:7 weight ratio was used. A dipole moment per unit volume was 97.1 D·mol/L in the first solvent, and viscosity of the solvent measured using a LVDV2T-CP viscometer of BROOKFIELD AMETEK, Inc. was 0.38 cP (25° C.) The DV$^2$ factor value calculated based thereon was 0.39. The manufactured battery was charged and discharged at 25° C.

Comparative Example 1

Untreated common sulfur ($S_8$) and a carbon nanotube were evenly mixed in a weight ratio of 70:30 to prepare a sulfur-carbon mixture, and the result was left in a 155° C. oven for 30 minutes to prepare a sulfur-carbon composite.

The sulfur-carbon composite prepared above, a conductive additive and a binder were mixed to prepare slurry for forming a positive electrode active material layer. Herein, vapor grown carbon fiber was used as the conductive additive, and styrene butadiene rubber/carboxymethyl cellulose (SBR/CMC 7:3) was used as a binder. The mixing ratio herein was employed such that the sulfur-carbon composite:the conductive additive:the binder was 90:5:5 in a weight ratio.

The slurry prepared as above was coated on an aluminum foil current collector having a thickness of 20 μm, and then dried to prepare a positive electrode (energy density of positive electrode: 4.3 mAh/cm$^2$). In the prepared positive electrode, porosity of the positive electrode active material layer calculated based on the measurements of electrode weight and electrode thickness (using a TESA-pHITE device of TESA) was 60%, and the sulfur mass per unit area of the positive electrode active material layer was 3.0 mg/cm$^2$. The SC factor value calculated based thereon was 0.5.

The positive electrode prepared using the above-described method and a negative electrode were placed to face each other, and a separator was interposed therebetween to prepare an electrode assembly. Herein, lithium foil having a thickness of 60 μm was used as the negative electrode, and polyethylene having a thickness of 20 μm and porosity of 45% was used as the separator.

Subsequently, the electrode assembly was placed inside a case, and an electrolyte liquid was injected thereto to manufacture a lithium-sulfur secondary battery. Herein, the electrolyte liquid was prepared by dissolving lithium bis(trifluoromethylsulfonyl)imide (LiTFSI) having a 3 M concentration in an organic solvent, and as the organic solvent herein, a solvent obtained by mixing propionitrile (first solvent) and 1H,1H,2'H,3H-decafluorodipropyl ether (second solvent) in a 3:7 weight ratio was used. A dipole moment per unit volume was 97.1 D·mol/L in the first solvent, and viscosity of the solvent measured using a LVDV2T-CP viscometer of BROOKFIELD AMETEK, Inc. was 0.38 cP (25° C.) The DV$^2$ factor value calculated based thereon was 0.39. The manufactured battery was charged and discharged at 25° C.

Comparative Example 2

After dispersing iron phthalocyanine (FePc, product of Sigma Aldrich) (60 mg), a catalytic site, into N,N-dimethylformamide (DMF) (500 ml), a solvent, the result was bath sonicated for 10 minutes to prepare an iron phthalocyanine (FePc) dispersion liquid.

Subsequently, to the iron phthalocyanine (FePc) dispersion liquid prepared above, a carbon nanotube (product of CNano Technology) (940 mg) was added, and the result was bath sonicated for 10 minutes and stirred at a rate of 500 rpm for 4 hours at room temperature to obtain a mixture solution.

Then, the mixture solution prepared above was filtered using a vacuum pump and washed with ethanol (1000 ml), and upper layer powder of the mixture solution obtained from the filtration and the washing was dried for 12 hours at 80° C. to prepare a carbon nanotube (FePc-CNT) having iron phthalocyanine (FePc) introduced as a catalytic site.

A sulfur-carbon mixture was prepared by evenly mixing sulfur ($S_8$) and the catalytic site-introduced carbon nanotube (FePc-CNT) prepared above in a weight ratio of 70:30, and the sulfur-carbon mixture was left in a 155° C. oven for 30 minutes to prepare a sulfur-carbon composite.

The sulfur-carbon composite prepared above, a conductive additive and a binder were mixed to prepare slurry for forming a positive electrode active material layer. Herein, vapor grown carbon fiber was used as the conductive additive, and styrene butadiene rubber/carboxymethyl cellulose (SBR/CMC 7:3) was used as a binder. The mixing ratio herein was employed such that the sulfur-carbon composite:the conductive additive:the binder was 90:5:5 in a weight ratio.

The slurry prepared as above was coated on an aluminum foil current collector having a thickness of 20 μm, and then dried to prepare a positive electrode (energy density of positive electrode: 4.3 mAh/cm$^2$). In the prepared positive electrode, porosity of the positive electrode active material layer calculated based on the measurements of electrode weight and electrode thickness (using a TESA-pHITE device of TESA) was 60%, and the sulfur mass per unit area of the positive electrode active material layer was 3.0 mg/cm$^2$. The SC factor value calculated based thereon was 0.5.

The positive electrode prepared using the above-described method and a negative electrode were placed to face each other, and a separator was interposed therebetween to prepare an electrode assembly. Herein, lithium foil having a thickness of 60 μm was used as the negative electrode, and polyethylene having a thickness of 20 μm and porosity of 45% was used as the separator.

Subsequently, the electrode assembly was placed inside a case, and an electrolyte liquid was injected thereto to manufacture a lithium-sulfur secondary battery. Herein, the electrolyte liquid was prepared by dissolving lithium bis(trifluoromethylsulfonyl)imide (LiTFSI) having a 3 M concentration in an organic solvent, and as the organic solvent herein, a solvent obtained by mixing propionitrile (first solvent) and 1H,1H,2'H,3H-decafluorodipropyl ether (second solvent) in a 3:7 weight ratio was used. A dipole moment per unit volume was 97.1 D·mol/L in the first solvent, and viscosity of the solvent measured using a LVDV2T-CP viscometer of BROOKFIELD AMETEK, Inc. was 0.38 cP (25° C.) The DV$^2$ factor value calculated based thereon was 0.39. The manufactured battery was charged and discharged at 25° C.

Comparative Example 3

A lithium secondary battery was prepared in the same manner as in Example 1 except that an electrolyte liquid including a second electrolyte liquid composition was used. The electrolyte liquid including a second electrolyte liquid composition was prepared by dissolving lithium bis(trifluoromethyl sulfonyl)imide (LiTFSI) having a concentration of 1 M and 1% by weight of lithium nitrate in an organic solvent, and as the organic solvent herein, a solvent obtained by mixing 1,3-dioxolane (first solvent) and dimethoxyethane (second solvent) in a weight ratio of 5:5 was used. In the first solvent, a dipole moment per unit volume was 97.1 D·mol/L, and viscosity of the solvent measured using a LVDV2T-CP viscometer manufactured by BROOKFIELD AMETEK Inc. was 0.38 cP (25° C.). A DV$^2$ factor value calculated based thereon was 1.77. The manufactured battery was charged and discharged at 25° C.

Conditions of the example and the comparative examples were summarized and shown in the following Table 1.

TABLE 1

| | Electrolyte Liquid Composition | SC factor | DV$^2$ factor | NS factor | ED factor (0.1 C) |
|---|---|---|---|---|---|
| Example 1 | First Electrolyte Liquid Composition [1] | 0.5 | 0.39 | 0.78 | 1258 |
| Comparative Example 1 | | 0.5 | 0.39 | 0.78 | 1218 |
| Comparative Example 2 | | 0.5 | 0.39 | 0.78 | 1254 |
| Comparative Example 3 | Second Electrolyte Liquid Composition [2] | 0.42 | 1.77 | 4.21 | 914 |

[1] First electrolyte liquid composition = Propionitrile: 1H,1H,2'H,3H-Decafluorodipropyl ether (3:7, w/w) solvent, 3.0M LiTFSI
[2] Second electrolyte liquid composition = 1,3-Dioxolane (DOL): Dimethyl ether (DME) (5:5, v/v) solvent, 1.0M LiTFSI, 1% by weight LiNO$_3$ Experimental Example 1. Performance Evaluation on Lithium-Sulfur Secondary Battery Performance of each of the lithium-sulfur secondary batteries manufactured in the example and the comparative examples was evaluated using a charge and discharge measurement device (LAND CT-2001A, Wuhan, China).

For each of the lithium-sulfur secondary batteries, measurements were made over 3 times at 25° C. under a condition of 2.5 cycles of 0.1 C (0.55 mA·cm$^{-2}$) charge/0.1 C (0.55 mA·cm$^{-2}$) discharge, then 3 cycles of 0.2 C (1.1 mA·cm$^{-2}$) charge/0.2 C (1.1 mA·cm$^{-2}$) discharge, and then 0.3 C (1.65 mA·cm$^{-2}$) charge/0.5 C (2.65 mA·cm$^{-2}$) discharge. The results obtained herein were shown in Table 2 and FIG. 2.

TABLE 2

|  | Example 1 | Comparative Example 1 | Comparative Example 2 | Comparative Example 3 |
|---|---|---|---|---|
| Discharge 25° C. Voltage (V) | 1.91 | 1.85 | 1.90 | 2.13 |
| $\Delta V_n$ (%) | 3.3 | — | 2.7 | — |
| Catalytic Site Support Amount (% by Weight) | 0.3 | — | 1 | 0.3 |

Figure 2:
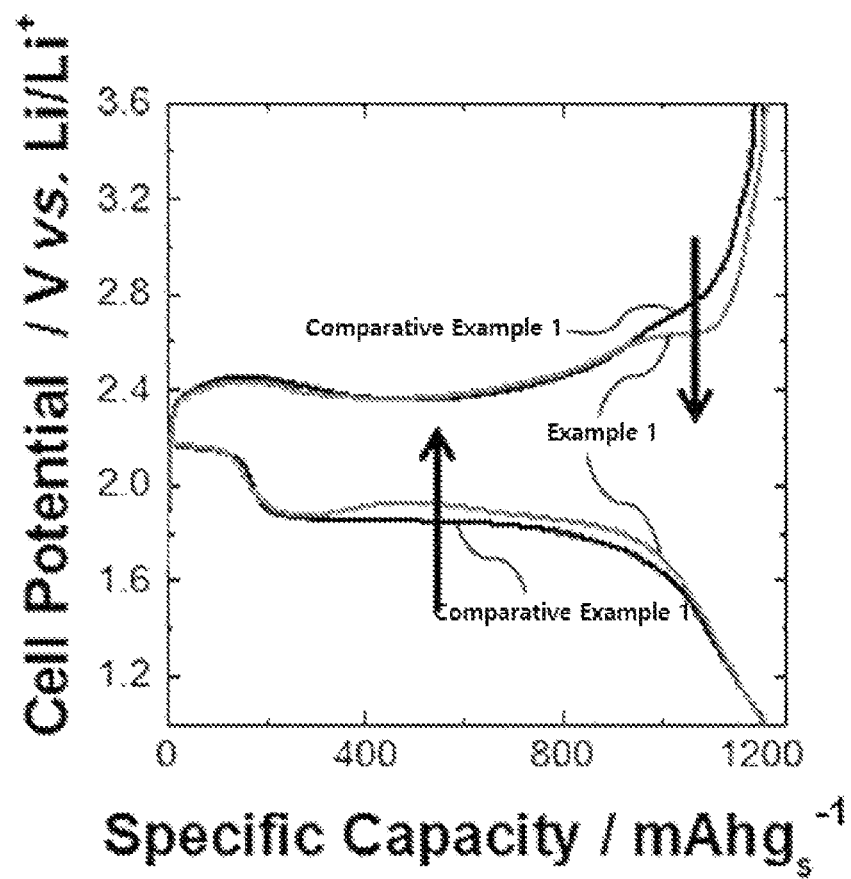
FIG. 2 is a graph presenting results of performance evaluation on lithium-sulfur secondary batteries according to Experimental Example 1 of the present invention.

As shown in FIG. 2, it was identified that the lithium-sulfur secondary battery including the positive electrode according to the present invention had excellent discharge capacity and overvoltage properties compared to Comparative Example 1.

When referring to FIG. 2, it was identified that, when evaluating performance of each of the lithium-sulfur secondary batteries manufactured in Example 1 and Comparative Example 1 at 25° C., the lithium-sulfur secondary battery of Example 1 had a significantly improved overvoltage at initial discharge compared to the lithium-sulfur secondary battery of Comparative Example 1, and discharge capacity was improved as well. Particularly, it was identified that an overpotential occurring near 100 mAh/g was significantly improved compared to the lithium-sulfur secondary battery of Comparative Example 1.

In addition thereto, when referring to Table 2, it was identified that Example 1 having the catalytic site present inside the sulfur exhibited a high overpotential improving effect with a smaller amount of the catalytic site compared to Comparative Example 2 having the catalytic site present on the carbon surface.

From such results, it was seen that, by the lithium-sulfur secondary battery of the present invention including a sulfur-carbon composite including a catalytic site-introduced sulfur in a positive electrode, and by the positive electrode and the electrolyte liquid satisfying specific conditions, an overvoltage improving effect was significantly superior, and higher energy density that has not been able to obtain in conventional lithium-sulfur secondary batteries was able to be stably obtained.

REFERENCE NUMERAL

10: Sulfur
20: Catalytic Site

The invention claimed is:
1. A lithium-sulfur secondary battery comprising:
a positive electrode;
a negative electrode;
a separator; and
an electrolyte liquid,
wherein the positive electrode includes catalytic site-introduced sulfur;
wherein the positive electrode has an SC factor value represented by the following Mathematical Formula 1 of 0.45 or greater and 4.5 or less:

$$SC \text{ factor} = \alpha \times \frac{L}{P} \quad \text{[Mathematical Formula 1]}$$

in Mathematical Formula 1,
P is porosity (%) of a positive electrode active material layer in the positive electrode;
L is a mass of sulfur per unit area (mg/cm$^2$) of the positive electrode active material layer in the positive electrode; and
α is 10,
wherein the SC factor defines the relationship between α, P, and L;
wherein the lithium-sulfur secondary battery has an ED factor value represented by the following Mathematical Formula 4 of 950 or greater:

$$ED \text{ factor} = V \times SC \text{ factor} \times \frac{C}{D} \quad \text{[Mathematical Formula 4]}$$

in Mathematical Formula 4,
V is a discharge nominal voltage (V) for Li/Li$^+$;
SC factor has the same value as defined in Mathematical Formula 1;
C is discharge capacity (mAh/g) when discharging at a 0.1 C rate; and
D is density (g/cm$^3$) of the electrolyte liquid, and
wherein the ED factor defines the relationship between V, SC factor, C and D,
wherein the catalytic site is positioned on a surface of the sulfur or on an inside of the sulfur, and
the electrolyte liquid comprises a solvent comprising a first solvent comprising propionitrile and a second solvent comprising 1H,1H,2' H,3H-decafluorodipropyl ether.
2. The lithium-sulfur battery of claim 1, wherein the catalytic site comprises a transition metal composite.
3. The lithium-sulfur battery of claim 1, wherein the catalytic site comprises at least one selected from the group consisting of iron phthalocyanine, nickel phthalocyanine, manganese phthalocyanine, copper phthalocyanine, cobalt phthalocyanine, and zinc phthalocyanine.
4. The lithium-sulfur battery of claim 1, wherein the catalytic site is present in an amount of 0.1% by weight to 5% by weight based on a total weight of the catalytic site-introduced sulfur.
5. The lithium-sulfur battery of claim 1, wherein the catalytic site is present in an amount of 0.05% by weight to 2.5% by weight based on a total weight of the positive electrode active material layer.
6. The lithium-sulfur battery of claim 1, wherein the positive electrode comprises a sulfur-carbon composite comprising a carbon material and the catalytic site-introduced sulfur on at least a part of an inside and a surface of the carbon material.

7. The lithium-sulfur secondary battery of claim 1, wherein the electrolyte liquid further comprises a lithium salt, and
the first solvent has a $DV^2$ factor value represented by the following Mathematical Formula 2 of 1.75 or less:

$$DV^2 \text{ factor} = \gamma \times \frac{\mu}{DV} \quad \text{[Mathematical Formula 2]}$$

in Mathematical Formula 2,
DV is a dipole moment per unit volume (D·mol/L);
μ is viscosity of the solvent (cP, 25° C.); and
γ is 100,
wherein the $DV^2$ factor defines the relationship between μ, γ, and DV.

8. The lithium-sulfur secondary battery of claim 7, wherein the first solvent has a $DV^2$ factor value of 1.5 or less.

9. The lithium-sulfur secondary battery of claim 7, wherein the lithium-sulfur secondary battery has an NS factor value represented by the following Mathematical Formula 3 of 3.5 or less:

$$NS \text{ factor} = \frac{DV^2 \text{ factor}}{SC \text{ factor}} \quad \text{[Mathematical Formula 3]}$$

in Mathematical Formula 3,
SC factor has the same value as defined in Mathematical Formula 1; and
$DV^2$ factor has the same value as defined in Mathematical Formula 2,
wherein the NS factor defines the relationship between the $DV^2$ factor and the SC factor.

10. The lithium-sulfur secondary battery of claim 1, wherein the first solvent further comprises at least one selected from the group consisting of dimethylacetamide, dimethylformamide, gamma-butyrolactone, triethylamine, and 1-iodopropane.

11. The lithium-sulfur secondary battery of claim 1, wherein the second solvent further comprises at least one selected from the group consisting of difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H, 1H,2' H-perfluorodipropyl ether.

12. The lithium-sulfur secondary battery of claim 1, wherein the first solvent is present in the solvent in an amount of 1% by weight to 50% by weight based on a total weight of the solvent.

13. The lithium-sulfur secondary battery of claim 1, wherein the second solvent is present in the solvent in an amount of 50% by weight to 99% by weight based on a total weight of the solvent.

14. The lithium-sulfur secondary battery of claim 11, wherein the first solvent and the second solvent are present in the solvent in a weight ratio of 3:7 to 1:9.

15. The lithium-sulfur battery of claim 1, wherein the electrolyte liquid comprises the first solvent further comprises at least one selected from the group consisting of dimethylacetamide, triethylamine, and 1-iodopropane.

16. The lithium-sulfur battery of claim 1, wherein the ED factor value of the lithium-sulfur secondary battery is in a range of 1258 or greater.

17. The lithium-sulfur battery of claim 1, wherein the SC factor value of the positive electrode is in a range of 0.45 or greater and 0.5 or less.

* * * * *